US011670322B2

(12) United States Patent
Koretzky et al.

(10) Patent No.: US 11,670,322 B2
(45) Date of Patent: Jun. 6, 2023

(54) METHOD AND SYSTEM FOR LEARNING AND USING LATENT-SPACE REPRESENTATIONS OF AUDIO SIGNALS FOR AUDIO CONTENT-BASED RETRIEVAL

(71) Applicant: Distributed Creation Inc., New York, NY (US)

(72) Inventors: Alejandro Koretzky, Los Angeles, CA (US); Naveen Sasalu Rajashekharappa, Los Angeles, CA (US)

(73) Assignee: Distributed Creation Inc., New York, NY (US)

( * ) Notice: Subject to any disclaimer, the term of this patent is extended or adjusted under 35 U.S.C. 154(b) by 215 days.

(21) Appl. No.: 16/942,410

(22) Filed: Jul. 29, 2020

(65) Prior Publication Data

US 2022/0036915 A1 Feb. 3, 2022

(51) Int. Cl.
*G10L 25/54* (2013.01)
*G06F 16/65* (2019.01)
(Continued)

(52) U.S. Cl.
CPC .............. *G10L 25/54* (2013.01); *G06F 3/165* (2013.01); *G06F 16/65* (2019.01); *G06F 18/214* (2023.01);
(Continued)

(58) Field of Classification Search
CPC . G06F 3/16; G06F 3/165; G06F 16/65; G06F 17/02; G06F 17/18; G06F 16/683;
(Continued)

(56) References Cited

U.S. PATENT DOCUMENTS

| 6,990,453 B2 | 1/2006 | Wang et al. |
| 7,295,977 B2* | 11/2007 | Whitman ................ G10L 17/02 704/232 |

(Continued)

FOREIGN PATENT DOCUMENTS

| EP | 1 260 968 B1 | 3/2005 |
| WO | WO/2015027751 A1 | 3/2015 |

OTHER PUBLICATIONS

Splice Blog, "Take a Look Under the Hood of Splice's Groundbreaking New Sound-Based Search", https://splice.com/blog/under-the-hood-similar-sounds/, last viewed on Sep. 1, 2020, 4 pages.
(Continued)

*Primary Examiner* — Gerald Gauthier
(74) *Attorney, Agent, or Firm* — Nicholson De Vos Webster & Elliott LLP

(57) ABSTRACT

A method and system are provided for extracting features from digital audio signals which exhibit variations in pitch, timbre, decay, reverberation, and other psychoacoustic attributes and learning, from the extracted features, an artificial neural network model for generating contextual latent-space representations of digital audio signals. A method and system are also provided for learning an artificial neural network model for generating consistent latent-space representations of digital audio signals in which the generated latent-space representations are comparable for the purposes of determining psychoacoustic similarity between digital audio signals. A method and system are also provided for extracting features from digital audio signals and learning, from the extracted features, an artificial neural network model for generating latent-space representations of digital audio signals which take care of selecting salient attributes of the signals that represent psychoacoustic differences between the signals.

20 Claims, 8 Drawing Sheets

(51) Int. Cl.
*G06F 3/16* (2006.01)
*G06N 3/08* (2023.01)
*G10L 21/12* (2013.01)
*G10L 21/14* (2013.01)
*G10L 25/30* (2013.01)
*G06F 18/214* (2023.01)

(52) U.S. Cl.
CPC ............... *G06N 3/08* (2013.01); *G10L 21/12* (2013.01); *G10L 21/14* (2013.01); *G10L 25/30* (2013.01)

(58) Field of Classification Search
CPC .......... G06F 21/16; G06F 21/55; G06F 40/30; G06K 9/6256; G06N 3/0445; G06N 3/0454; G06N 3/08; G06N 3/084; G06N 3/04; G06N 3/044; G10H 1/0025; G10H 2210/031; G10H 2210/061; G10H 2210/076; G10H 2240/131; G10H 2250/215; G10H 2250/311; G10H 1/00; G10H 1/0008; G10H 1/0033; G10H 1/12; G10H 1/20; G10H 1/38; G10H 1/40; G10H 7/10; G10L 21/12; G10L 21/741; G10L 25/18; G10L 25/30; G10L 25/54; G10L 15/16; G10L 17/02; G10L 21/0272; G10L 21/14; G10L 25/03; H04N 19/85; H04R 29/00; G06T 7/73
See application file for complete search history.

(56) References Cited

U.S. PATENT DOCUMENTS

| | | | |
|---|---|---|---|
| 7,865,368 B2 | 1/2011 | Li-Chun Wang et al. | |
| 8,378,200 B1* | 2/2013 | Beigel | G10H 1/12 84/610 |
| 8,688,253 B2 | 4/2014 | Master et al. | |
| 9,230,528 B2* | 1/2016 | Kellett | G10H 1/0025 |
| 10,446,126 B1* | 10/2019 | Kaye | G10H 1/20 |
| 10,839,826 B2* | 11/2020 | Humphrey | G06F 16/683 |
| 11,503,421 B2* | 11/2022 | Daly | G10H 1/0033 |
| 2002/0002899 A1 | 1/2002 | Gjerdingen et al. | |
| 2003/0040904 A1* | 2/2003 | Whitman | G10L 17/02 704/212 |
| 2005/0098022 A1* | 5/2005 | Shank | G10H 1/0025 84/612 |
| 2007/0124293 A1 | 5/2007 | Lakowske et al. | |
| 2007/0291958 A1* | 12/2007 | Jehan | G10H 1/0025 381/103 |
| 2008/0183320 A1 | 7/2008 | Iketani et al. | |
| 2008/0249982 A1 | 10/2008 | Lakowske | |
| 2010/0142715 A1 | 6/2010 | Goldstein et al. | |
| 2013/0317815 A1* | 11/2013 | Hong | G10L 25/18 704/232 |
| 2014/0072126 A1* | 3/2014 | Uhle | H04R 29/00 381/56 |
| 2014/0254831 A1* | 9/2014 | Patton | G10H 1/00 381/107 |
| 2016/0284347 A1* | 9/2016 | Sainath | G06N 3/084 |
| 2018/0225083 A1* | 8/2018 | Barkley | G10H 7/10 |
| 2018/0276540 A1* | 9/2018 | Xing | G10H 1/0008 |
| 2019/0066713 A1* | 2/2019 | Mesgarani | G10L 25/30 |
| 2019/0304480 A1* | 10/2019 | Narayanan | G06F 3/16 |
| 2019/0333487 A1* | 10/2019 | Patitucci | G10H 1/40 |
| 2020/0043517 A1* | 2/2020 | Jansson | G06N 3/08 |
| 2020/0066240 A1* | 2/2020 | Huo | G10H 1/38 |
| 2020/0322377 A1* | 10/2020 | Lakhdhar | G06F 17/18 |
| 2020/0380338 A1* | 12/2020 | Matsumura | G06K 9/6256 |
| 2021/0049468 A1* | 2/2021 | Karras | H04N 19/85 |
| 2021/0248983 A1* | 8/2021 | Balassanian | G06F 21/16 |
| 2021/0357451 A1* | 11/2021 | Wold | G06F 40/30 |
| 2022/0036915 A1* | 2/2022 | Koretzky | G10L 25/54 |
| 2022/0238087 A1* | 7/2022 | Steffensen | G06N 3/04 |

OTHER PUBLICATIONS

Constine, John, "Splice Teaches AI to Sell Similar Sounds as Users Double", Tech Crunch, dated Nov. 21, 2019, 6 pages.
Briot et al., "Deep Learning Techniques for Music Generation—A Survey", arXiv:1709.01620v3 [cs.SD], Mar. 23, 2019, 199 pages.
Çakir et al., "Musical Instrument Synthesis and Morphing in Multidimensional Latent Space Using Variational, Convolutional Recurrent Autoencoders", AES 145th Convention Best Student Paper Award, Audio Engineering Society, Convention Paper 10035, Oct. 17-20, 2018, 9 pages.
International Search Report and Written Opinion, PCT App. No. PCT/US2021/043427, dated Nov. 15, 2021, 23 pages.
Provotar et al., "Unsupervised Anomaly Detection in Time Series Using LSTM-Based Autoencoders", 2019 IEEE International Conference on Advanced Trends in Information Theory (ATIT), Dec. 18, 2019, pp. 513-517.

* cited by examiner

Figure 5

GUI Table 548

| Time | | Filename | |
|---|---|---|---|
| 550  0:02 | [waveform] | WB_UPR_Bass_150bpm_005_F.wav | Show Similar |
| 552  0:08 | [waveform] | OS_MLF_C_Wobble_Piano.wav | Show Similar ← 558 |
| 554  0:09 | [waveform] | Drum_loop_break_27_112.wav | Show Similar |
| 556  0:15 | [waveform] | 004_a_Drum_Beat_125bpm.wav | Show Similar |

| Time | Filename | |
|---|---|---|
| 550 0:02 | WB_UPR_Bass_150bpm_005_F.wav | Show Similar |
| 552 0:08 | OS_MLF_C_Wobble_Piano.wav | Hide Similar |
| Similar Sounds | | |
| 658 0:04 | OS_FF_C_Electric_Key_Ht.wav | |
| 660 0:03 | OS_DD_C_Rusty_Key.wav | |
| 662 0:03 | OS_FAR2_C_Wobble_Piano.wav | |
| 664 0:11 | EFC1_05_Piano_02_C3.wav | |
| 666 0:08 | PL_SLPH3_04_Piano_C3.wav | |
| | + More | |

METHOD AND SYSTEM FOR LEARNING AND USING LATENT-SPACE REPRESENTATIONS OF AUDIO SIGNALS FOR AUDIO CONTENT-BASED RETRIEVAL

TECHNICAL FIELD

The present invention relates to computer-implemented methods and systems for learning and using latent-space representations of digital audio signals and, more particularly, to such computer-implemented methods and systems in the context of audio content-based retrieval.

BACKGROUND

Psychoacoustics encompasses the study of the spaces of sound and the mechanics of sound perception by humans. Unlike with visual information, it is typically more difficult for a human to verbally describe certain attributes of a sound using objective terminology. For example, there is no widely accepted objective terminology to describe differences in timbre.

Different people may describe the same timbre differently. For example, one person may describe timbre by the musical instrument that produces the sound, another person may describe timbre by the quality and tone of the sound (e.g., bright, brassy, reedy, harsh, raspy, shrill, etc.), and yet another person may describe timbre by the emotion of the sound (e.g., excited, angry, happy, sad, etc.). Other elements of sound, especially in music, that are not easily described include rhythm, melody, dynamics, and texture.

Despite this difficulty, many existing audio content retrieval computing systems are keyword based. That is, audio content is tagged with (e.g., indexed by) keywords describing the audio content. Users of such computing systems then search for or browse for desired audio content using the keywords.

Keyword tagging/indexing works well when the audio content is tagged/indexed by objective attributes such as, for example, an artist's name, a song title, a musical genre, a pitch of the chromatic scale, beats per minute, or other objective attributes. However, searching or browsing for audio content based on keywords does not work as well when the user has difficulty articulating in words the audio content being sought, or the attributes of the desired audio content that make it stand out to the user in a psychoacoustic sense, are subjective or multi-factored. For example, the user may be looking for vocal samples that sound like a particular singer singing a particular melody with particular phrasing but that are not necessarily exactly that singer, that melody, or that phrasing. Likewise, the user may be looking for drum loops that sound similar to, but not necessarily identical to, a particular rhythmic pattern.

The recognition of similar sounds has long been of interest. Powerful computer-implemented techniques exist for their detection. Features of digital audio signals used for computer-based sound similarity recognition often include manually selected features such as the spectral centroid, the spectral bandwidth, or the spectral flatness of the digital audio signal. Manual methods exist for feature selection for sound similarity detection that provide the advantage of full knowledge and control over how digital audio signals are represented and allow for fine tuning of the composition of features selected according to the requirements of the particular implementation at hand. Unfortunately, these methods are often defeated by omitting useful discriminative features, being unaware of useful discriminative features, or using largely redundant features.

The present invention addresses this and other needs.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Some embodiments of the present invention are illustrated by way of example, and not in way by limitation, in the figures of the accompanying drawings and in which like reference numerals refers to similar elements and in which:

FIG. 5 is a mock-up of an example graphical user interface for a similar sounds application in an audio-content based retrieval system, according to some embodiments of the present invention.

FIG. 6 is a mock-up of a state change in the example graphical user interface of FIG. 5 in response to input by an end-user, according to some embodiments of the present invention.

Figure 1:
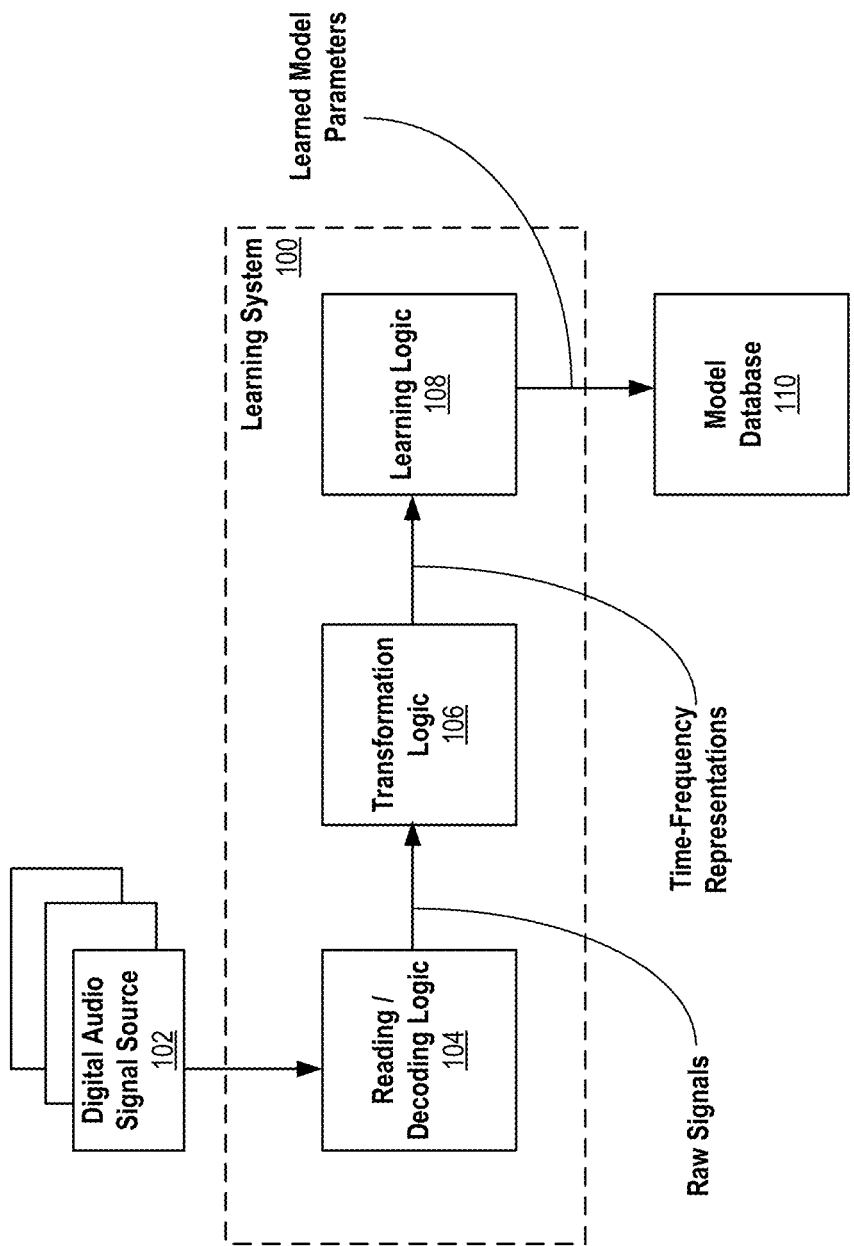
FIG. 1 is a schematic diagram of a system for learning latent-space representations of digital audio signals, according to some embodiments of the present invention.

While the figures illustrate some embodiments of the present invention for purposes of illustrating clear examples, some embodiments of the present invention may omit, add to, reorder, or modify any of the elements shown in the figures.

DETAILED DESCRIPTION

In the following description, for the purposes of explanation, numerous specific details are set forth in order to provide a thorough understanding of some embodiments of the present invention. It will be apparent, however, that some embodiments of the present invention may be practiced without these specific details. In other instances, well-known structures and devices are shown in block diagram form in order to avoid unnecessarily obscuring some embodiments of the present invention.
1.0 GENERAL OVERVIEW
2.0 EXAMPLE LATENT-SPACE REPRESENTATION
  LEARNING SYSTEM IMPLEMENTATION
  2.1 LOOP AND ONE-SHOTS
  2.2 SOUND CONTENT CATEGORIES 2.3 READING/DECODING LOGIC
2.4 TRANSFORMATION LOGIC
2.4.1 PRE-PROCESSING
2.4.2 DURATION NORMALIZATION
2.4.3 TIME-FREQUENCY REPRESENTATION
2.4.4 LOOP SIGNAL EXPANSION
2.5 LEARNING LOGIC
2.5.1 EXAMPLE ARTIFICIAL NEURAL NETWORK
2.5.2 EXAMPLE ARTIFICIAL NEURAL NETWORK ARCHITECTURE
3.0 EXAMPLE LATENT-SPACE REPRESENTATION LEARNING PROCESS
4.0 EXAMPLE APPLICATIONS OF SOUND EMBEDDINGS
4.1 SIMILAR SOUND SEARCH
4.2 SOUND AS SEARCH INPUT
4.3 NEAR-DUPLICATE SOUND DETECTION
5.0 IMPLEMENTATION MECHANISMS—HARDWARE OVERVIEW
6.0 IMPLEMENTATION MECHANISM—SOFTWARE OVERVIEW
7.0 OTHER ASPECTS OF DISCLOSURE 1.0 General Overview According to some embodiments of the present invention, a method and system are provided for extracting features from digital audio signals which exhibit variations in pitch, timbre, decay, reverberation, and other psychoacoustic attributes and learning, from the extracted features, an artificial neural network model for generating contextual latent-space representations of digital audio signals, where learning such a model for generating such contextual latent-space representations have confounded existing learning systems and methods.

According to some embodiments of the present invention, a method and system are provided for learning an artificial neural network model for generating consistent latent-space representations of digital audio signals in which the generated latent-space representations are comparable for the purposes of determining psychoacoustic similarity between digital audio signals and where learning such a model for generating such consistently comparable learned latent-space representations have confounded existing learning methods and systems.

According to some embodiments of the present invention, a method and system are provided for extracting features from digital audio signals and learning, from the extracted features, an artificial neural network model for generating latent-space representations of digital audio signals which take care of selecting salient attributes of the signals that represent psychoacoustic differences between the signals, where such selection has confounded existing approaches.

According to some embodiments of the present invention, machine learning techniques are used to learn latent-space representations of digital audio signals in the form of vectors or sets of numerical codes referred to herein as "sound embeddings." The sound embeddings may be learned in an unsupervised fashion thereby reducing or eliminating the need for manually generated or computer-generated labeling of training examples with target variables (labels). In addition, the sound embeddings learned may be of higher quality (i.e., more representative of the differences in sound) compared to a more manual approach, as the sound embeddings may encode attributes of the audio signal that a human conducted manual approach may not even be aware of, or that are difficult for a human to fully understand. Higher quality sound embeddings means better representations of audio signals, which translates into more consistent similar measurements between signals, ultimately resulting in high quality and more robust audio similarity search and recommendations 2.0 Latent-Space Representation Learning System FIG. 1 is a schematic of a system for learning an artificial neural network model for generating latent-space representations of digital audio signals, according to some embodiments of the present invention. System 100 is programmed or configured to read digital audio signal sources (e.g., data files containing digital audio data) and to train an artificial neural network, based on the digital audio signals, to learn a model capable of generating sets of numerical codes (sound embeddings) providing latent-space representations of digital audio signals.

A set of numerical codes generated by the learned model for a digital audio signal that provides a latent-space representation of the digital audio signal is sometimes referred to hereinafter as a "sound embedding" of the digital audio signal. A sound embedding may be represented in computer storage media by a vector containing the numerical codes. Each numerical code is typically a real number represented in a computer storage media by a floating-point value.

Because of the latent-space representation, sound embeddings of digital audio signals that are closer together according to a distance measure (e.g., cosine similarity, Euclidean distance, etc.) reflect more similar sounding digital audio signals as perceived by the human ear when played back than sound embeddings of digital audio signals that are farther apart according to the distance measure. Among other applications, the sound embeddings may be used to identify similar sounding digital audio signals and to make recommendations of digital audio signals in a corpus of digital audio signals that sound similar to a reference digital audio signal.

Figure 7:
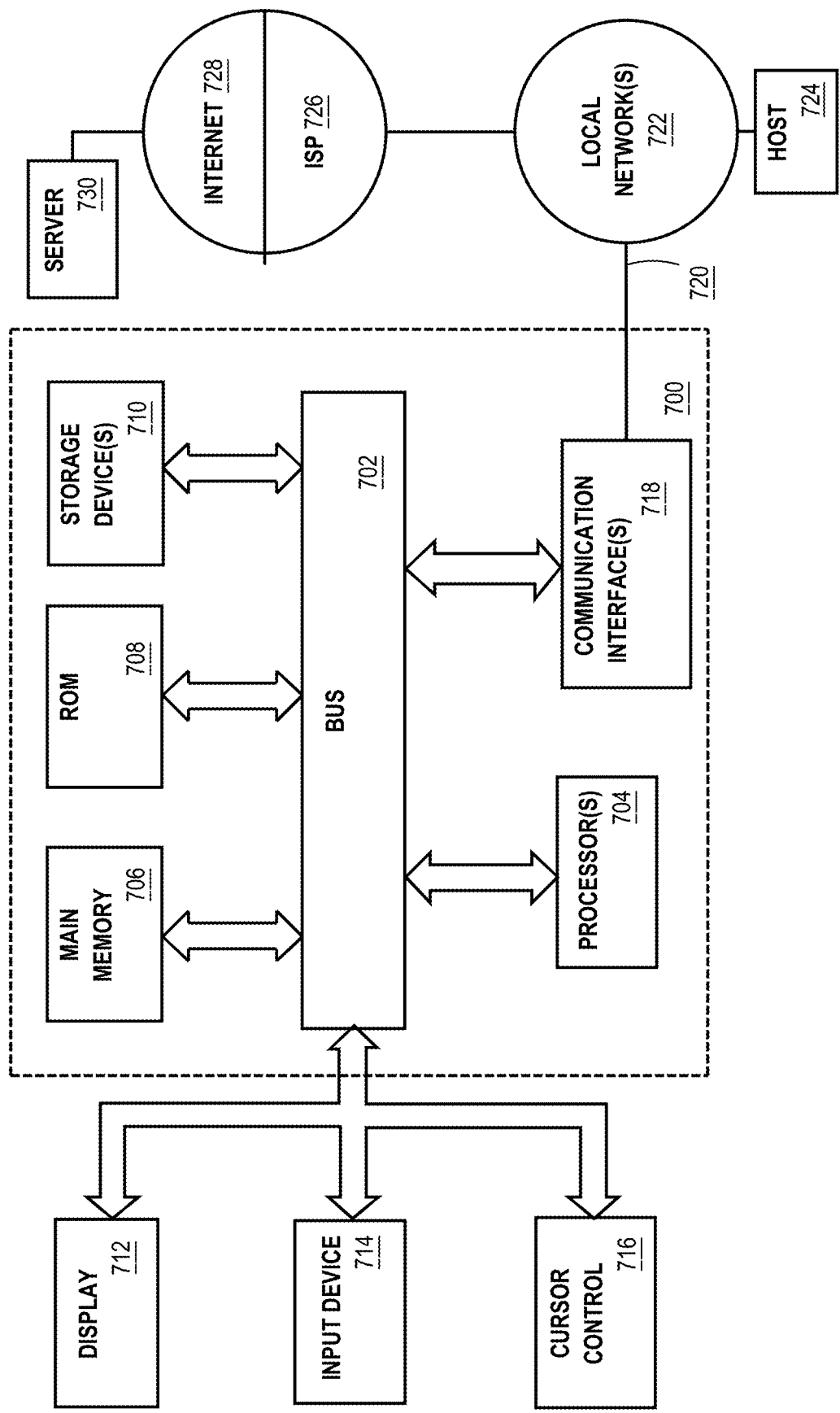
FIG. 7 is a schematic diagram of an example computing device with which some embodiments of the present invention may be implemented.

Learning system 100 may be implemented using one or more physical computing devices, none of which is intended as a generic computer, since it may be loaded with instructions in a new ordered combination as otherwise disclosed herein to implement the methods of this disclosure. FIG. 7 described below is a schematic of one example of a computing device that may be used in a learning computing system to implement the methods of this disclosure.

The components of system 100 may be implemented at least partially by computer hardware at one or more computing devices, such as one or more hardware microprocessors executing stored program instructions stored in one or more computer memories for performing the methods that are described herein. Or, one or more virtual machine instances in a shared computing facility such as a cloud computing center may be used.

Methods described herein are intended to indicate operations that are performed using programming in a special-purpose computer or general-purpose computer. System 100 illustrates only one of many possible arrangements of components configured to execute the methods. Other arrangements may include fewer or different components, and the division of work between the components may vary depending on the arrangement.

One or more components of system 100 may be implemented on the same computing device. Thus, the separation of components of system 100 is merely illustrative of one possible computing architecture. Components of system 100 may be distributed over multiple computing devices in a distributed computing arrangement. For example, a distributed computing arrangement may be used for computing performance or scalability reasons according to the requirements of the particular implementation at hand.

2.1 Loops and One-Shots

System 100 may include reading/decoding logic 104. Logic 104 is programmed or configured to read a digital audio signal source 102 such as a file or other data container (e.g., a computer database record) containing digital audio signal data. In some embodiments of the present invention, the digital audio signal contained by source 102 is a recording of a musical or other auditory performance by a human in the form of a loop or a one-shot. The loop or one-shot may also be computer or machine generated.

A loop is a repeating section of audio material created using any one of a number of different technologies including, but not limited to, microphones, turntables, digital samplers, looper pedals, synthesizers, sequencers, drum machines, tape machines, delay units, programing using computer music software, etc. A loop often encompasses a rhythmic pattern or a note or chord sequence or progression that corresponds to a number of musical bars (e.g., one, two, four, or eight bars). The loop may be repeated indefinitely and yet retain an audible sense of musical continuity.

A one-shot may also be created using any one of a number of different technologies such as those listed in the previous paragraph. However, a one-shot is not like a loop in that the section of sound material does not repeat in a one-shot. Instead, a one-shot typically corresponds to a single audible event having a clear onset at the beginning of the event followed by an exponentially decaying sound pattern. For example, a one-shot may encompass a sound of a single note or chord or percussive instrument strike (e.g., a strike of a drum kit piece).

While the term "one-shot" implies a single note or chord or strike or other sound, a one-shot is not so limited and may encompass more than one note, chord, strike, or other sounds in succession or in a progression. Further, while some one-shots may encompass the single audible event pattern just described where there is a clear audible onset at the beginning followed by an exponentially decaying sound pattern, other one-shots may not follow this pattern such as, for example, reverse samples or certain sound effects. In any case, one-shots on average are typically shorter in playback length than loops.

While the digital audio signal contained by source 102 may encompass a loop or one-shot, the digital sound signal contained by source 102 may encompass any computer or machine generated or recorded sound that is within the human hearing range of approximately 20 to 20,000 Hertz.

In some instances, digital audio signal source 102 belongs to a corpus of digital audio signal sources. The corpus may contain hundreds, thousands, millions, or more digital audio signal sources. For example, the corpus may be a library of user, computer, or machine generated or recorded sounds such as, for example, a musical sample library provided by a cloud-based music creation and collaboration platform such as, for example, the sound library available from SPLICE.COM of Santa Monica, Calif. and New York, N.Y. or the like.

2.2 Sound Content Categories

In some embodiments of the present invention, an artificial neural network is trained to learn a model for generating sound embeddings for digital audio signals in a given sound content category. There may be multiple different sound content categories and multiple corresponding models learned using an artificial neural network. The different models may be used to generate sound embeddings for digital audio signals in the different sound content categories.

The different sound content categories may reflect the general differences in the underlying statistical distributions of the digital audio signals in the different sound content categories. In this way, a sound content category may correspond to a class or type of statistical distribution. By training an artificial neural network to learn a model for generating sound embeddings based on a set of training examples that all belong to the same sound content category, the artificial neural network can better learn the discriminative features of digital audio signals in the sound content category resulting in higher quality sound embeddings generated for digital audio signals in the sound content category, when compared to other training techniques. Ultimately, the high-quality sound embeddings can be used to make better recommendations of similar sounds in the sound content category.

The set of sound content categories may be predefined and digital audio signal sources (e.g., 102) may be tagged with one or more sound content categories to which they are assigned or to which they belong. For example, digital audio signal sources may be indexed in a database by, or otherwise associated with, one or more sound content category labels/tags.

The sound content category labels/tags may be assigned to digital audio signal sources based on the underlying statistical distributions of the digital audio signals. For example, a one-shot digital audio signal typically exhibits a clear onset at the beginning of the signal, typically has a short duration, and typically has an exponentially decaying release pattern. Or the reverse of this pattern for a reverse one-shot. On the other hand, a loop digital audio signal will typically exhibit a periodic or quasi-periodic pattern over the time of the signal.

According to some embodiments of the present invention, the corpus of digital audio signal sources is divided into at least two different sound content categories: loops and one-shots. Loops and one-shots may be assigned to different sound content categories based on their typically fundamentally different statistical distributions over the time of the signal.

A loop sound content category and a one-shot sound content category may be further subdivided based on instrument, instrument type, genre, mood, or other sound attributes suitable to the requirements of the particular implementation at hand, to form a hierarchy of sound content categories. As an example, a hierarchy of sound content categories might include the following top-level sound content categories: "loops" and "one-shots". Then, each of those top-level sound content categories might include, in a second level of the hierarchy, a "drum" category and an "instrument" category." Instruments may include vocals and musical instruments other than drums. In this example, then, four sound content categories are provided: "drum loops," "dump one-shots," "instrument loops," and "instrument one-shots."

Loops, one-shots, drums, and instruments (e.g., vocals and musical instruments other than drums) are non-limiting examples of attributes reflecting different statistical distributions of digital audio signals over the times of the signals that may be used to divide a corpus of digital audio signal sources into different sound content categories. However, other divisions are possible, and the present invention is not limited to any particular divisions. For example, another possible hierarchical division of a corpus of digital audio signal sources into sound content categories might be:

One-shots
Drums
Instruments
Loops
Drums
Instruments
Reverse samples
Drums
Instruments
Sound effects While sound content categories may be heuristically or empirically selected according to the requirements of the particular implementation at hand including based on the expected or discovered different classes or types of statistical distributions over time of the digital audio signals in the corpus, sound content categories may be learned or computed according to a computer-implemented unsupervised clustering algorithm (e.g., an exclusive, overlapping, hierarchical, or probabilistic clustering algorithm).

For example, digital audio signal sources may be grouped (clustered) into different clusters based on similarities between one or more attributes extracted or detected from the digital audio signals of the sources. Such sound attributes on which the audio signals may be clustered might include, for example, one or more of: statistical distribution of signal amplitude over time, zero-crossing rate, spectral centroid, the spectral density of the signal, the spectral bandwidth of the signal, or the spectral flatness of the signal. When clustering, digital audio signals that are more similar with respect to one or more of these sound attributes should be more likely to be clustered together in the same cluster and digital audio signals that are less similar with respect to one or more of these sound attributes should be less likely to be clustered together in the same cluster.

As mentioned above, the corpus of digital audio signal sources may be grouped into sound content categories and a separate artificial neural network model may be learned for each sound content category using, as a training set for the learning, the set of digital audio signal sources that are assigned to or belong to the sound content category. It should be noted that, while a digital audio signal source in the corpus can belong to only a single sound content category, it might belong to multiple sound content categories if, for example, an overlapping clustering algorithm is used to identify the sound content categories.

Thus, digital audio signal source 102 may be viewed as one digital audio signal source belonging to a training set of multiple (e.g., hundreds, thousands, millions, or more) digital audio signal sources for training an artificial neural network to learn a model for generating sound embedding for a particular sound content category. A training set containing digital audio signal sources all belonging to a particular sound content category is sometimes referred to herein as the "source" training set. The particular sound content category for which an artificial neural network is trained based on the source training set is sometimes referred to herein as the "source" sound content category. And the model for the source sound content category learned by the artificial neural network as a result of the training using the source training set is sometimes referred to herein as the "target" model. Different sound content categories can have different source training sets and different target models may be learned for the different sound content categories.

2.3 Reading/Decoding Logic

As mentioned, system 100 may include reading/decoding logic 104. Reading/decoding logic 104 is programmed or configured to read digital audio signal source 102 and generate "raw" digital audio signal samples based on digital audio signal source 102. The reading/decoding logic 104 is communicatively coupled to transformation logic 106 and can send raw digital audio samples to transformation logic 106 for further processing.

The digital audio signal of source 102 may be uncompressed, compressed in a lossless encoding format, or compressed in a lossy encoding format. Example possible formats of the digital audio signal of source 102 indicated by their known file extension may include, but are not limited to, .AAC, .AIFF, .AU, .DVF, .M4A, .M4P, .MP3, .OGG, .RAW, .WAV, and .WMA.

System 100 includes reading/decoding logic 104 that is programmed or configured to read source 102, decode/uncompress the digital audio signal contained therein if necessary, and generate raw digital audio signal samples based on the digital audio signal.

A raw digital audio signal sample generated by reading/decoding logic 104 can be taken in the time domain of digital audio signal. For example, a pulse-code modulation (PCM) sample is an example of a possible raw digital audio signal sample. A PCM signal is a sequence of raw digital audio signal samples containing data that provides information for reconstructing the original audible audio signal. A PCM sample may represent the amplitude of the audible audio signal at a specific point in time. PCM samples of a PCM signal may be uniformly spaced in time. The amplitude may be the only information explicitly contained in the PCM sample. For example, a PCM sample may contain an integer or floating-point number, encoded as a binary number using a number of binary digits representing the PCM sample's bit depth.

Decoding of the digital audio signal of source 102 may not be needed by reading/decoding logic 104 if the digital audio signal itself is already composed of raw digital audio signal samples. For example, a digital audio signal may include raw digital audio signal samples in .WAV format for which decoding is not needed. On the other hand, the .MP3 format is a compressed, lossy format for which decoding of the digital audio signal may be needed in order to generate the raw digital audio signal samples. Accordingly, reading/decoding logic 104 can be programmed or configured to include various digital audio signal source 102 readers and decoders for various different audio formats. Reading/decoding logic 104 can then select the appropriate readers and/or decoders for generating raw digital audio signal samples based on the particular format of the digital audio signal of source 102.

Once the raw digital audio signal has been generated by reading/decoding logic 104 from the digital audio signal of source 102 or if the digital audio signal is already a raw digital audio signal, then the raw digital audio signal can be provided (e.g., sent or transmitted) to transformation logic 106.

2.4 Transformation Logic

According to some embodiments of the present invention, transformation logic 106 transforms a raw digital audio signal received from reading/decoding logic 104 into one or more time-frequency representations of the raw digital audio signal. Transformation logic 106 then provides the one or more generated time-frequency representations to learning logic 108 for further processing. According to some embodiments, the time-frequency representations are normalized and then input to an artificial neural network for learning the target model. According to some embodiments of the present invention, the transformation performed by transformation logic 106 varies depending on the source sound content category.

2.4.1 Pre-Processing

In some embodiments of the present invention, transformation logic 106 downsamples the raw digital audio signal. This downsampling may be done to reduce the dimensionality of the time-frequency representations input to an artificial neural network when learning the target model. For example, digital audio signals may be downsampled by half or approximately half from 44,100 Hertz or 48,000 Hertz to 22,050 Hertz. By reducing the input dimensionality of the time-frequency representations, the computing resources and time to learn the target model may be reduced without significantly affecting the accuracy effectiveness of the target model.

In addition to downsampling, for the purpose of speeding up the training of an artificial neural network without significantly affecting the effectiveness of the target model learned, the raw digital audio signal may be converted from stereo samples to mono audio samples (e.g., by computing the mid channel). Alternatively, just the left channel or just the right channel may be used.

Other preprocessing on the raw digital audio signal may be performed by transformation logic 106. For example, a pre-emphasis filter may be applied to balance the frequency spectrum between small magnitude high frequencies and larger magnitude lower frequencies, to avoid numerical issues during Fourier transform, or to improve the signal-to-noise ratio (SNR) of the signal.

Other preprocessing on the raw digital audio signal may be performed such as compression or equalization or other preprocessing suitable to the requirements of the particular implementation at hand.

2.4.2 Duration Normalization

According to some embodiments of the present invention, transformation logic 106 performs duration normalization on a raw digital audio signal or a pre-processed raw digital audio signal received from reading/decoding logic 104. The raw digital audio signal or the pre-processed raw digital audio signal is referred to hereinafter as the "target" signal. The target signal may be normalized to a predetermined duration. The predetermined duration may be based on the source sound content category. Different sound content categories may have different predetermined durations. However, it is possible for different sound content categories to have the same predetermined duration.

Normalizing each target signal in the source training set where each such target signal has the same predetermined duration for the source sound content category facilitates the extraction of same dimensionality time-frequency representations from the target signals for input to an artificial neural network when learning the target model. In other words, each time-frequency representation generated for each target signal for the source training set may have the same dimensionality as a consequence of normalizing the target signals for the source training set to the same predetermined duration for the source sound content category. As used herein, reference to the "same" duration means that two durations are the same if they have the same time length at up a predetermined time resolution (e.g., milliseconds). For example, two signals both 500 milliseconds in length have the same duration even if they differ in time length at nanosecond time resolution.

Duration normalization of a target signal to a predetermined duration by transformation logic 106 can be accomplished by truncating samples from the end of the target signal or trimming samples from the beginning of the target signal, if the target signal has a duration greater than the predetermined duration. If the target signal is shorter in duration than the predetermined duration, then dummy digital audio signal samples (e.g., zero-value samples) can be appended to the target signal until the target signal duration equals the predetermined duration.

As a result of duration normalization performed by transformation logic 106 on the target signal, the target signal is normalized as a "duration normalized" signal having the predetermined duration for the source sound content category. As an example of how the predetermined duration might vary between sound content categories consider a loop sound content category and a one-shot sound content category.

If the source sound content category is a one-shot sound content category, then an initial portion of the target signal where the clear onset of the one-shot is present may be selected as the duration normalized signal. This may correspond to within the first second or so of the target signal in the case of a drum one-shot, for example. Thus, the predetermined duration for a drum one-shot target signal might be, for example, just under a second or so. For an instrument or vocal one-shot target signal, the duration normalized signal might be slightly longer than with a drum one-shot target signal (e.g., within the first few seconds or so) reflecting the typically relatively longer duration of the onset before the release in an instrument or vocal one-shot target signal. As a result, the predetermined duration for an instrument or vocal one-shot target signal may be between one and three seconds or so. More generally, the portion of a one-shot target signal taken as the duration normalized signal may be selected based on various attributes of the target signal including, but not limited to, the portion of the target signal containing the onset of the one-shot sound.

On the other hand, if the source sound content category is a loop sound content category, then the predetermined duration may be sufficiently long to capture at least one cycle of the repeating periodic or quasi-periodic patterns of each loop signal for the source training set. For example, for musical loops spanning two, four, or eight musical bars, the predetermined duration may be greater than three seconds but less than five seconds. For example, if the source sound content category is a loop sound content category, the predetermined duration for the source sound content category may be selected based on the average or mean duration of one cycle of the repeating periodic or quasi-periodic patterns of the loop signals for the source training set.

2.4.3 Time-Frequency Representation

According to some embodiments of the present invention, transformation logic 106 is programmed or configured to receive a duration normalized signal and generate a time-frequency representation of the duration normalized signal by computing a time-frequency transform of the duration normalized signal. The time-frequency representation is a representation of the spectrum of frequencies of the duration normalized signal as they vary with time. According to some embodiments of the present invention, the time-frequency transform is a complex-valued transform made up of complex numbers in the form of z=a+ix, where "a" represents the real part of the number and "x" represents the imaginary part of the number.

According to some embodiments of the present invention, the time-frequency representation is a magnitude spectrogram calculated based on a complex spectrogram of the duration normalized signal, by calculating the absolute value of the complex spectrogram where the y-axis represents frequency and the x-axis represents timeframes. The value in each time-frequency slot represents a specific energy level of the duration normalized signal. The magnitude matrix may be represented by transformation logic 106 in computer storage media as a matrix of real numbers which may be represented by transformation logic 106 in computer storage media as floating-point values.

Transformation logic 106 may be programmed or configured to generate a time-frequency representation for the duration normalized signal by using a time-frequency transform. Some examples of time-frequency transforms that may be used include, but are not limited to, a Short-Time Fast Fourier Transform (STFT), a Constant-Q transform, a Wavelet, a filter bank, and the like.

Transformation logic 106 may optionally apply a non-linear interpolation to the time-frequency representation of the duration normalized signal. Applying non-linear interpolation to the time-frequency representation is intended to provide more weight and improved resolution to frequency bands where the human auditory system has better resolution, thereby improving the ability to learn discriminating attributes for those frequencies. The human auditory system generally has a hearing range of 20 Hz to 20 kHz, although under ideal laboratory conditions the hearing range may be as wide as 12 Hz to 28 kHz. Thus, from a practical perspective for human listening, learning discriminative attributes of audio is only relevant for frequencies in the human hearing range.

If applied, the non-linear interpolation applied by transformation logic 106 may use one of many different interpolations based on the context of human auditory scales, sometimes referred to as psychoacoustic scales. Examples of such psychoacoustic scales include the mel scale, the Bark Scale, and/or the Equivalent Rectangular Bandwidth (ERB) scale. Thus, transformation logic 106 may use one or more of these psychoacoustic scales to apply non-linear interpolation to the time-frequency representation.

According to some embodiments of the present invention, the time-frequency transform applied to the duration normalized signal is a complex Short-Time Fourier Transform (STFT) and transformation logic 106 computes the complex STFT on the duration normalized signal according to a selected window size (e.g., 1024 samples) and a selected hop size (e.g., 128 samples, 256 samples, etc.), either or both of which may vary depending on the source sound content category. For example, timeframes of the complex STFT transform may overlap each other according to the selected window size and the selected hop size. The selected hop size represents how many signal samples to advance the origin of the current timeframe of the duration normalized signal to set the origin of the next time frame of the duration normalized signal to undergo the complex STFT transform. For example, if timeframes have 1,024 audio signal samples according to the selected window size and the selected hop size is 256 signal samples, then the origin of the current timeframe of the duration normalized signal is advanced 256 audio signal samples resulting in an overlap of 768 audio signal samples (75% overlap) in the duration normalized signal between the previous current timeframe and the new current timeframe.

In some embodiments of the present invention, the hop size for the complex STFT transform is selected based on the source sound content category. In particular, the smaller the hop size, the more redundancy between timeframes is captured. For a source sound content category where the duration normalized signals in the category have relatively fast transients, or the predetermined duration of the duration normalized signals in the category is relatively short, such as, for example, with drum one-shots, a relatively smaller hop size may be used so that the target model can better discriminate between transitions of spectro-temporal patterns of the duration normalized signals in the category.

A drawback of using a smaller hop size is that there are more timeframes to be processed and the amount of temporal context captured by a given number of consecutive timeframes is less. For a source sound content category encompassing duration normalized signals that do not have fast transients, or that has a longer predetermined duration, such as, for example, an instrument or vocal one-shot source sound content category, a relatively larger hop size may be used to reduce the number of timeframes to be processed by transformation logic 108 and to capture a greater amount of temporal context per given number of consecutive timeframes, without great sacrifice to the discriminative ability of the target model generated.

According to some embodiments of the present invention, the magnitude STFT is computed from the complex STFT of the duration normalized signal. A magnitude spectrogram is then generated from the magnitude STFT. Non-linear interpolation is then applied to the magnitude spectrogram. According to some embodiments of the present invention, a power spectrum STFT of the complex STFT is computed by transformation logic 106 instead of the magnitude STFT and then non-linear interpolation is applied to the power spectrum STFT.

According to some embodiments of the present invention, a window function such as a Hamming window function or other suitable window function is applied to each timeframe of the duration normalized signal in anticipation of the complex STFT transform on the timeframe.

In some embodiments of the invention, transformation logic 108 produces a N by M time-frequency representation (e.g., magnitude spectrogram) where N is the number of different frequency bins and M is the number of timeframes, which depends on the window size, the hop size, and the predetermined duration of duration normalized signal. In some embodiments of the present invention, N is 128 values for each timeframe of the duration normalized signal. However, no particular number N of values is required.

As mentioned above, each duration normalized signal in the source sound content category can have the same predetermined duration. This duration is sometimes referred to herein as the source content category's "target duration" For example, each duration normalized signal in a "drums one-shot" sound content category might have a target duration of 0.78 seconds, each duration normalized signal in an "instrument one-shot" sound content category might have a target duration of a 1.48 seconds, and each duration normalized signal in "loop" sound content category might have a target duration of 3.75 seconds. However, no particular target duration is required. And, as mentioned, different sound content categories may have different target durations.

The time dimension M of the time-frequency representation, as mentioned, may vary depending on the target duration of the source sound content category, selected window size, and the selected hop size for the source sound content category. For example, duration normalized signals in a drums one-shot category with a target duration of 0.743 seconds and a selected hop size of 128 time-domain samples may each have generated time-frequency representations with a dimensionality of 128 by 128 for a total of 16,384 values for each time-frequency representation. Duration normalized signals in an instrument one-shot category with a target duration of 1.486 seconds and a selected hop size of 256 time-domain samples may also each have generated time-frequency representations with a dimensionality of 128 by 128 values. The dimensionalities of the time-frequency representations generated for these two categories may be the same in the M dimension even though the target duration of the instrument one-shot category is twice the target duration of the drum one-shot category because the instrument one-shot category is also twice the selected hop size of the drum one-shot category, assuming the same selected window size for both categories. As another example, duration normalized signals in a drums loop category with a target duration of 3.75 seconds and a selected hop size of 256 may each have generated time-frequency representations with a dimensionality of 128 by 320 for a total dimensionality of 40,960 values for each time-frequency representation.

Before time-frequency representations of duration normalized signals are passed to learning logic 108 for learning the target model, normalization processing may be performed on the values of the time-frequency representations. For example, the values of the time-frequency representations can be min-max normalized to values between 0 and 1 inclusive or −1 to 1 inclusive to aid the learning algorithm (e.g., gradient descent) of the artificial neural network converge. Other normalizations are possible such as, for example, mean normalization, Z-score normalization, or scaling to unit length.

2.4.4 Loop Signal Expansion

According to some embodiments of the present invention, multiple time-frequency representations are generated by transformation logic 106 from a single duration normalized signal for a loop source sound content category. This expansion of the duration normalized signal in a loop source sound content category into multiple time-frequency representations may be done during training for learning the target model. In particular, this expansion may be performed by transformation logic 106 to provide better temporal context when learning the target model based on the source training set of loop digital audio signal sources. The repeating patterns in duration normalized loop signals may have different durations and different periodic or quasi-periodic repeating patterns. Further, the repeating patterns may not be aligned across the duration normalized loop signals for the source training set. For example, some duration normalized loop signals for the source training set may begin at the beginning of the repeating pattern of the loop signal, other duration normalized loop signals for the source training set may begin in the middle of the repeating pattern of the loop signal, and still other duration normalized signals for the source training set may begin at the end of the repeating pattern of the loop signal.

To account for these differences within the duration normalized loop signals for the source training set, multiple time-frequency representations may be generated from multiple randomly selected "slices" of each duration normalized signal. Each such selected slice may have the same predetermined duration as the source sound content category and thus the same duration as the duration normalized loop signal. For each selected slice, the time-frequency representation of the slice may be generated using techniques described above for generating a time-frequency representation of a duration normalized signal except using the slice signal instead of the duration normalized signal. In this way, multiple time-frequency representations can be generated for multiple slices of the duration normalized signal.

When randomly selecting a slice of a loop duration normalized signal, the start time of the slice may be randomly selected where the start time is within the duration of the loop signal. The slice may then be taken as a time-shifted version of the duration normalized signal that starts at the randomly selected start time, then wraps around the end of the duration normalized signal back to the start of the slice such that the selected slice signal has the same duration as the duration normalized signal. Alternatively, the selected slice signal may warp around the beginning of the duration normalized signal back to the start of the slice signal. In this way, multiple slice signals of the duration normalized signal can be obtained from differently randomly selected start times during the time of the duration normalized signal where each such slice signal has the predetermined duration for the source sound content category.

In some embodiments of the present invention, instead of randomly selecting slices from the duration normalized signal, slices are randomly selected from a time-frequency representation of the entire duration normalized signal. In these embodiments, to select a slice of the time-frequency representation such as a magnitude spectrogram, a timeframe of the magnitude spectrogram may be randomly selected. This slice, then, may be a time-shifted version of the magnitude spectrogram of the entire duration normalized signal that starts at the randomly selected timeframe and wraps around the end or the beginning of the magnitude spectrogram and ends back at the randomly selected timeframe. In this way, multiple randomly selected slices of a time-frequency representation of an entire duration normalized signal can be obtained from differently randomly selected starting timeframes of the time-frequency representation.

In either case, a duration normalized loop signal can be expanded into multiple time-frequency representations. In some embodiments, the multiple time-frequency representations are distinct such that no two of the time-frequency representations start at the same point in the duration normalized signal.

By expanding duration normalized loop signals in the source training set into multiple time-frequency representations, the diversity of the training examples input to the artificial neural network can be expanded without having to obtain more digital audio signal sources to include in the source training set. For example, a source training set of one-hundred thousand loop digital audio signal sources can be expanded in this way to millions of different training examples input to the artificial neural network during training.

For example, if batch gradient descent is used during training of the artificial neural network based on a selected batch size N (e.g., 32), then N number of time-frequency representations may be generated form each duration normalized loop signal for the source training set and passed through the artificial neural network in a forward pass before backpropagation. By doing so, the error on which the gradients are computed will be an average of the errors of all N time-frequency representations in the batch.

As a result of processing performed by transformation logic 106, one or more time-frequency representations of a duration normalized signal may be provided by transformation logic 106 to learning logic 108.

It should be noted that the above-described operations performed by reading/decoding logic 104 and transformation logic 106 may be re-ordered in some instances. For example, a digital audio signal from source 102 or a raw signal audio signal can first be duration normalized by transformation logic 106 to a duration normalized signal, then reading/decoding logic 104 can pre-process the duration normalized signal to a pre-processed version of the duration normalized signal based on which transformation logic 106 generates one or more time-frequency representations.

2.5 Learning Logic

Reading/decoding logic 104 and transformation logic 106 can be applied to each digital audio signal source in the source training set to generate a set of time-frequency representations. This set of time-frequency representations generated for the source training set may be used by learning logic 108 to train an artificial neural network to learn the target model.

It should be noted that it is not necessary to generate the entire set of time-frequency representations from the source training set before learning logic 108 begins to train an artificial neural network. Instead, the artificial neural network may be trained in a parallel pipeline fashion in which training the artificial neural network based on some of the time-frequency representations in the set begins the entire set has been generated.

According to some embodiments, when training an artificial neural network to learn the target model given a training example, the artificial neural network is programmed or configured to attempt to take a time-frequency representation, transform it into a reduced latent-space representation, and attempt to transform the reduced latent-space representation back into the time-frequency representation. During training, this may be repeated until the artificial neural network has learned to generate a reduced latent-space representation from which it can reproduce the time-frequency representation within an error bound according to a loss function.

2.5.1 Example Artificial Neural Network

Figure 2:
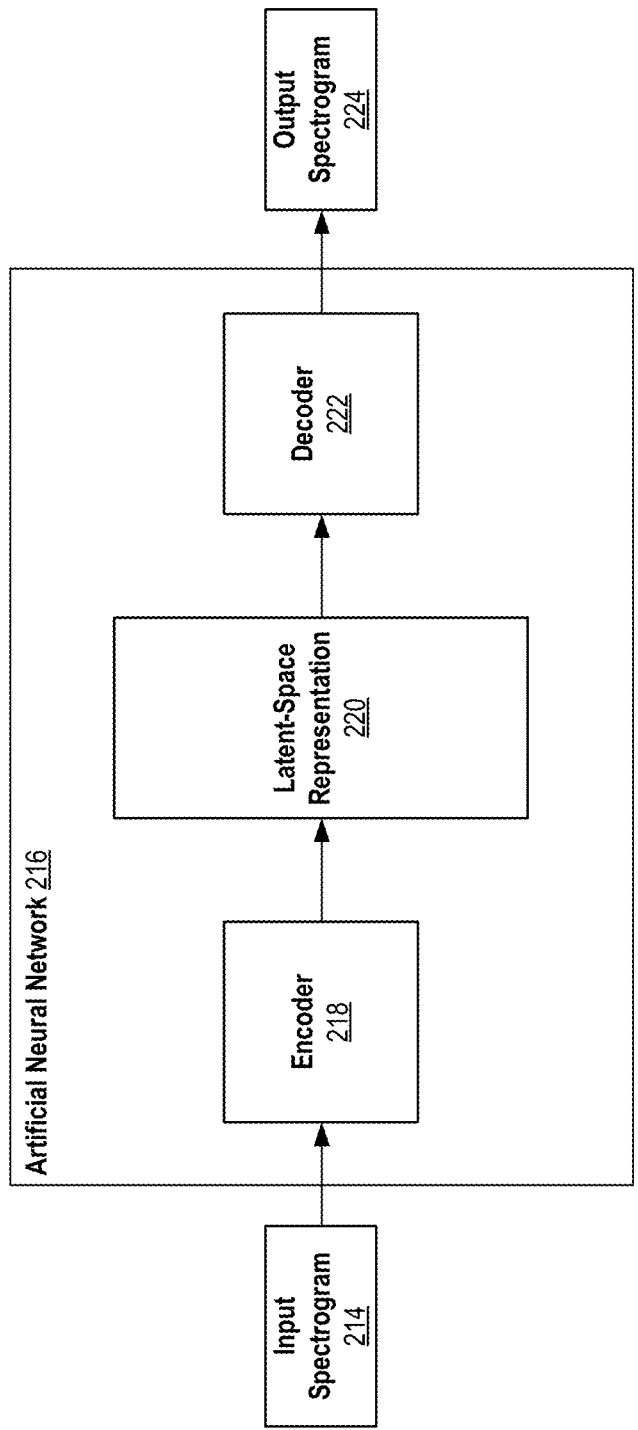
FIG. 2 is a schematic diagram of an artificial neural network in the system for learning latent-space representations of digital audio signals, according to some embodiments of the present invention.

FIG. 2 is a schematic of artificial neural network 216 that may be a component of learning logic 110 for learning a sound embedding for input time-frequency representation 214, according to some embodiments. As shown, artificial neural network 216 encompasses three components: encoder 218, latent-space representation 220, and decoder 222.

According to some embodiments, artificial neural network 216 is programmed or configured to attempt to learn via backpropagation to generate (by encoder 218) latent-space representation 220 and jointly attempt to learn via backpropagation to generate (by decoder 222) output time-frequency representation 224 from latent-space representation 220 where output time-frequency representation 224 is close (lossy) representation of input time-frequency representation 214. As part of learning the target model, the discrepancy between the estimated/reconstructed time-frequency representation 224 and the input spectrogram 214, which is quantified by a chosen loss function such as, for example, mean-squared error, may be used to iteratively adjust the weights across network 216, in order to reduce the error between the input spectrogram 214 and the estimated/reconstructed time-frequency representation at the output of the network 224.

Latent-space representation 220 represents input time-frequency representation 214 as lower-dimensional embedding containing a set of fewer numerical values yet still retains salient discriminative information about input time-frequency representation 214. For example, the dimensionality reduction may be 64 to 1 where input time-frequency representation 214 has, for example, a dimensionality of 128 by 128 values and latent-space representation 220 has a dimensionality of 256 numerical values. However, no particular dimensionality reduction ratio is required and 64 to 1 is merely one example.

In some embodiments of the present invention, artificial neural network 216 may be trained specifically for a particular source content category. That is, once trained, the target model resulting from training artificial neural network 216 based on the source training set for the source content category can be used to generate sound embeddings only for audio signals in the source content category and might not be able to be used to generate meaningful sound embeddings for audio signals that do not belong or are not assigned to the source content category.

Estimated/reconstructed time-frequency representation 224 may be lossy with respect to input time-frequency representation 214. That is, it is not required that estimated/reconstructed time-frequency representation 224 be an identical (lossless) representation of input time-frequency representation 224.

A benefit of artificial neural network 216 is that pre-labeling the training examples in the source training set is not required. Instead, artificial neural network 216 is capable of learning lower-dimensional representations of the training examples in source training set in the form of latent-space representations (e.g., 220) where the lower-dimensional representations retain meaningful discriminative information about the underlying statistical distributions of the source sound content category.

Artificial neural network 216 may have a number of hyperparameters. One of the hyperparameters may specify the dimensionality of the intermediate layer in charge of learning the sound embedding, also known as the bottleneck layer 220. Other hyperparameters may include the number of intermediate (e.g., hidden) layers in encoder 218 and decoder 222, the loss function to use during training (e.g., mean squared error), among other possible hyperparameters.

2.5.2 Example Artificial Neural Network Architecture

Figure 3:
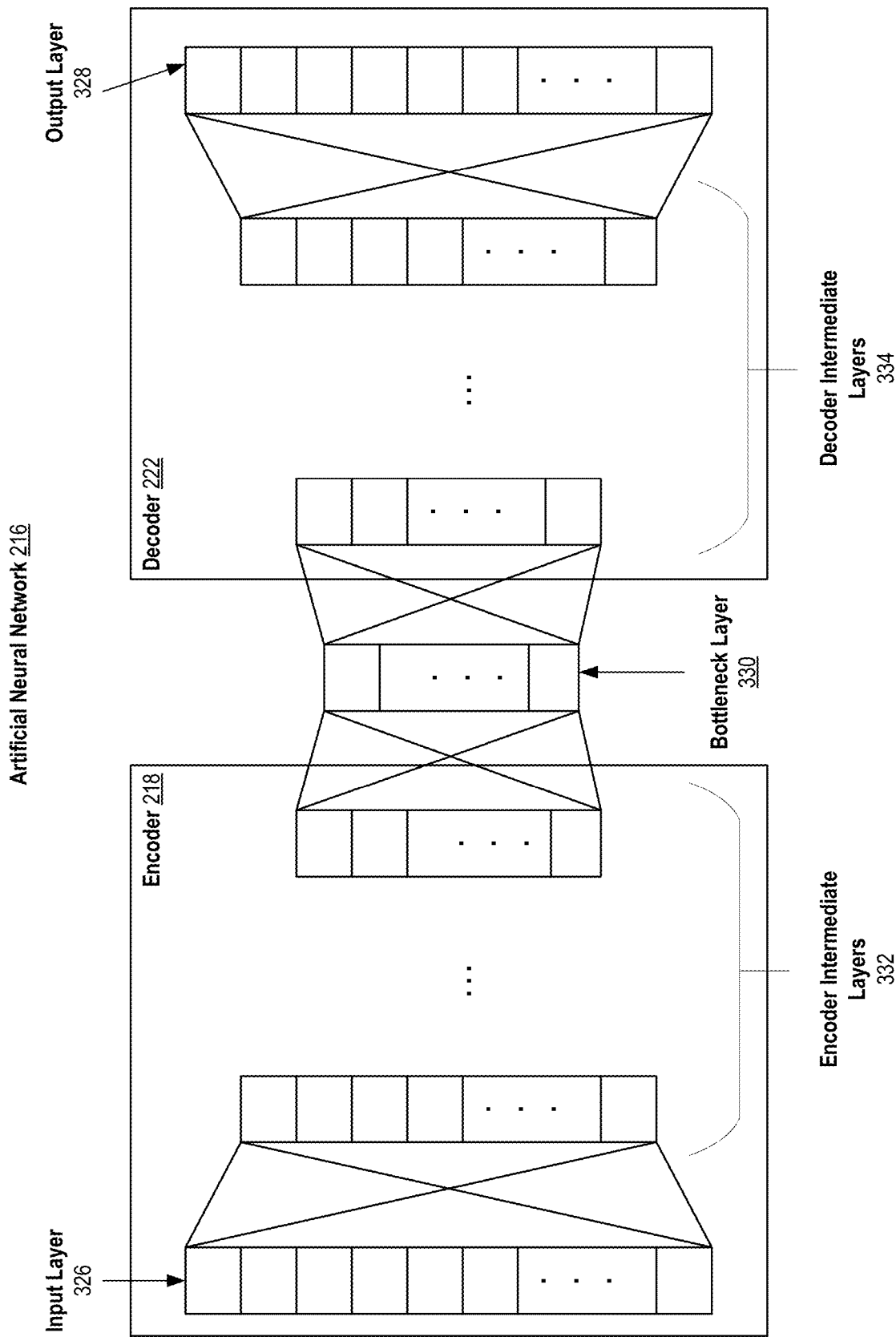
FIG. 3 is a schematic of an architecture of the artificial neural network in the system for learning latent-space representations of digital audio signals, according to some embodiments of the present invention.

FIG. 3 is a schematic of a possible architecture of artificial neural network 216, according to some embodiments of the present invention. The architecture includes input layer 326, encoder intermediate layers 332, bottleneck layer 330, decoder intermediate layers 334, and output layer 328. Input layer 326 may encompass normalized values of time-frequency representation 214 for compression by encoder intermediate layers 332 into bottleneck layer 330. Likewise, output layer 328 may encompass normalized values of estimated/reconstructed time-frequency representation 224 generated by decoder intermediate layers 334 from bottleneck layer 330. Bottleneck layer 330 may be viewed as the output layer of encoder 218 and the input layer of decoder 222.

During training via backpropagation, time-frequency representation 214 in input layer 326 passes through intermediate layers 332 of encoder 218 to produce latent-space representation 220 in bottleneck layer 330. Encoder 218 may be a fully connected artificial neural network. Likewise, decoder 222 may be a fully connected artificial neural network.

The latent-space representation 220 in bottleneck layer 330 passes through intermediate layers 334 of decoder 222 to produce estimated/reconstructed time-frequency representation 224 in output layer 328. Thus, the dimensionality of input layer 326 and output layer 328 may be the same. The dimensionality of bottleneck layer 330 is less than the dimensionality of input layer 326 and output layer 328. The number of encoder intermediate layers 332 can be one or more. If more than one, then an intermediate layer closer to bottleneck layer 330 may optionally have fewer units than the next closest intermediate layer 332 to force encoder 218 to learn to generate a summary, lossy, and reduced dimensionality latent-space representation 220 of time-frequency representation 214 in bottleneck layer 330.

The number of decoder intermediate layers 334 can also be one or more and may have the same number or a different number of layers as encoder intermediate layers 332. If more than one decoder intermediate layers 334, than an intermediate layer of decoder 222 closer to output layer 328 may optionally have more than the next closest intermediate layer 334 to force decoder 222 to learn to generate estimated/reconstructed time-frequency representation 224 in output layer 328 from latent-space representation 220 in bottleneck layer 330 where the estimated/reconstructed time-frequency representation 224 generated is close to time-frequency representation 214. All intermediate layers 332 and 334 of encoder 218 and decoder 222, respectively, may optionally have higher dimensionality than bottleneck layer 330. Input layer 326 and output layer 328 may optionally have higher dimensionality than intermediate layers 332 and 334.

In some embodiments of the present invention, encoder intermediate layers 332 include convolutional, activation, and pooling layers and decoder intermediate layers 334 include convolutional, activation, and upsampling layers. By using convolutional layers in encoder intermediate layers 332 and decoder intermediate layers 334, artificial neural network 216 can be trained without having to modify time-frequency representation 214 (and consequently lose spatial information) as might be required by a feedforward neural network implementation that uses dense layers. For example, flattening the two-dimensional time-frequency representation into a one-dimensional vector can be avoided by using convolutional layers. Using convolutional layers also allows the learning process to capture important two-dimensional spectro-temporal patterns presented in the magnitude STFT.

In some embodiments of the present invention, encoder intermediate layers 332 or decoder intermediate layers 334 include one or more recurrent layers in addition to, or instead of, one or more convolutional layers. For example, encoder intermediate layers 332 or decoder intermediate layers 334 could include one or more long short-term memory (LSTM) layers or one or more gated recurrent unit (GRU) layers in addition to, or instead of, one or more convolutional layers.

3.0 Example Latent-Space Representation Learning Process

Figure 4:
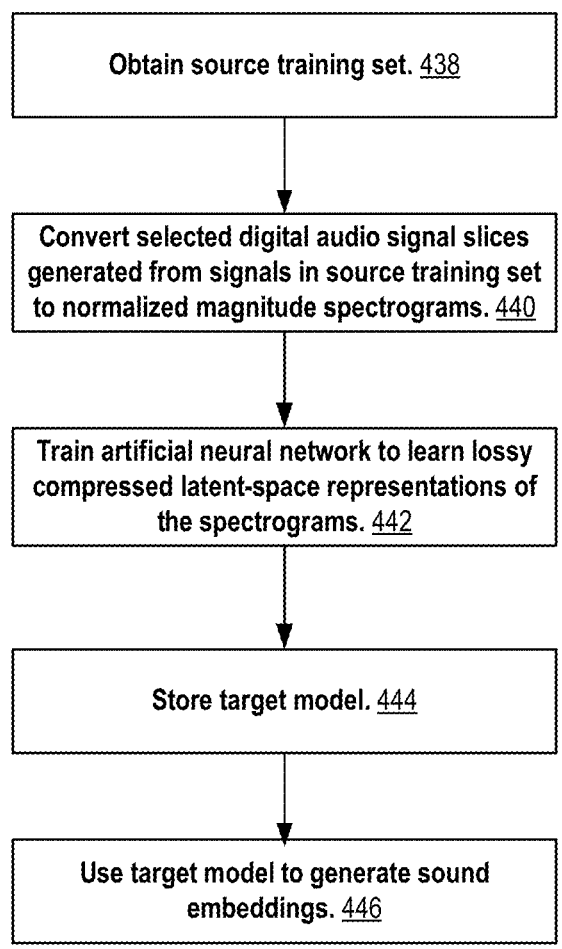
FIG. 4 is a flowchart of a process performed by the system for learning latent-space representations of digital audio signals, according to some embodiments of the present invention.

FIG. 4 is a flowchart of example process 436 performed by system 100 for learning latent-space representations of digital audio signals, according to some embodiments. FIG. 4 is intended to disclose an algorithm or functional description that may be used as a basis of writing computer programs to implement the functions that are described herein and which cause a computing system of one or more computing devices to operate in the new manner that is disclosed herein. Further, FIG. 4 is provided to communicate such an algorithm at the same level of detail that is normally used, by persons of skill in the art to which this disclosure is directed, to communicate among themselves about plans, designs, and algorithms for other computer programs of a similar level of complexity.

The process 436 may begin at step 438. At step 438, system 100 obtains a source training set. The source training set may be obtained by tagging or indexing digital audio signal sources containing digital audio signals by a particular source sound content category. Or, the source training set may be obtained by applying a clustering algorithm to a corpus of digital audio signals to identify a subset of similar digital audio signals that should belong together in a particular source sound content category. In either case, the digital audio signals in the source training set may all be similar to each other in that they all have the same general statistical distribution in the time domain. The statistics considered here can be varied but may include, for example, the time length of the digital audio signals or general similarity in one or more sonic attributes over the time of the digital audio signals such as, for example, the spectral centroid, the spectral flatness, or the spectral bandwidth. For example, the digital audio signals in the source training set may all have a one-shot pattern, all have a drum one-shot pattern, all have a vocal one-shot patterns, all have an instrument one-shot pattern, all have a loop pattern, all have a vocal loop pattern, all have an instrument loop pattern, all have a reverse one-shot pattern, etc.

At step 440, system 100 including reading/decoding logic 104 and transformation logic 106 generate one or more time-frequency representations from each digital audio signal in the source training set. This may include, for each digital audio signal, generating a target signal from the digital audio signal, generating a duration normalized signal from the target signal, and generating one or more time-frequency representations from the duration normalized signal, as described above.

At step 442, system 100 including learning logic 108 trains the artificial neural network via backpropagation to learn to generate latent-space representations of the time-frequency representations generated for the source training set. The artificial neural network may be trained in a batch gradient descent, a stochastic gradient descent, or a mini-batch gradient descent manner. In some embodiments, the artificial neural network is trained in a mini-batch gradient descent manner.

At step 444, once the artificial neural network is trained based on the source training set, the target model is stored by system 100 in model database 110. The target model may include learned parameters of the artificial neural network as a result of training 442. For example, the target model may include the learned parameters of the encoder (e.g., 218) of the artificial neural network.

At step 446, the target model is used to generate sound embeddings for digital audio signals that are assigned to or belong to the source content category. To do this for a particular reference digital audio signal, the system 100 including reading/decoding logic 104 and transformation logic 106 generates a time-frequency representation of the reference digital audio signal. To do this, for example, reading/decoding logic 104 may be used to generate a target signal from the reference digital audio signal and transformation logic 106 may be used to generate a duration normalized signal from the target signal. Transformation logic 106 may be used to generate a time-frequency representation of the duration normalized signal. If the reference digital audio signal is a loop signal, unlike during training when multiple time-frequency representations may be generated from a signal loop signal, a single time-frequency representation may be generated of the reference digital audio signal. Alternatively, reading/decoding logic 104 may be used to generate a duration normalized signal from the reference digital audio signal and transformation logic 106 may be used to generate a target signal from the duration normalized signal. Transformation logic 106 may be used to generate a time-frequency representation of the target signal.

In any case, the time-frequency representation of the reference digital audio signal may be normalized as is done by transformation logic 106 with the training examples during training.

The generated normalized time-frequency representation of the reference digital audio signal may be input to an artificial neural network configured with the parameters of the target model in a forward pass to generate as output a latent-space representation (i.e., sound embedding) for the reference signal. For example, the encoder 218 of the artificial neural network 216 may be configured with the learned parameters of the target model and the normalized time-frequency representation may be processed from input layer 326 in a forward pass through the encoder 218 only (i.e., not through decoder 222) to generate a sound embedding capturing the latent-space representation for the particular reference digital audio signal in the bottleneck layer 330.

This may be repeated for other reference digital audio signals assigned to or belonging to the source sound content category to generate sound embeddings for those signals. The sound embeddings have the useful property that the degree of similarity of two digital audio signals in the source sound content category for which sound embeddings are generated can be computed by measuring the distance between the sound embeddings according to a suitable distance measure. The closer the distance, the more similar they are in a psychoacoustic sense. The farther apart the distance, the less similar they are in a psychoacoustic sense. For example, the sound embeddings may be vectors of numbers and their sound similarly computed by a suitable distance measure such as, for example, a cosine distance between the two vectors where the closer the cosine distance, the more similar the audio signals sound.

Process 436 may be repeated for other sound content categories to learn target models and generate sound embeddings for audio signals in these other sound content categories.

4.0 Example Applications

Sound embeddings generated using the techniques disclosed herein can be used in many useful applications. No particular application is required. Two particular example applications will now be described.

4.1 Similar Sounds Search

According to some embodiments of the present invention, one or more digital audio signals in a particular sound content category that sound similar to a reference digital audio signal in the particular sound content category are identified and presented to a user in a graphical user interface. The similar sounding digital audio signals may be identified by a server computing system of one or more computing devices ("server system") and the graphical user interface may be presented to the user at the user's personal computing device ("client device"). The server system and the client may be connected by one or more data communications networks such as, for example, the Internet.

While the client-server distinction provides a useful framework for discussing the similar sounds embodiment, it is not a necessary distinction and the similar sounds embodiment may be implemented in other computing architecture contexts. For example, the functionality described below as being performed by the client and the server system may be embodied in a single computing device, some of the functionality described as being performed by the server system may be performed at the client device in some implementations, or some of the functionality described below as being performed by the client device may be performed at the server system in some implementations.

FIG. 5 is a mock-up of a possible computer graphical user interface of a similar sounds application, according to some embodiments of the present invention. In particular, the mock-up is of table 548 that may be presented in a graphical user interface at an end-user's computing device. The end-user's computing device may be a personal computing device such as a desktop or laptop computer or a portable electric device such as a mobile phone. The end-user's computing device may also be a dedicated music mixing computing device or other dedicated computing appliance that includes or is electrically coupled to a video display. No particular type of end-user computing device is required. In this regard, it should be noted that the mock-up of FIG. 5 is provided for the purpose of discussing a possible implementation and is not intended to be exhaustive of all possible graphical user interface implementations which may vary according to the requirements of the particular implementation at hand including the type of end-user computing device (e.g., desktop computer vs mobile computer) at which the graphical user interface is presented.

Table 548 includes a listing of one or more digital audio signal sources in a corpus of digital audio signal sources. The listing may be presented in table 548 in response to various different end-user inputs. For example, the listing may be presented as a search result in response to a keyword-based search query input by the end-user via a graphical user interface for searching the corpus for digital audio signal sources associated with, tagged, or indexed by keywords. However, the listing may be presented for other reasons (a listing resulting from browsing the corpus, a listing of popular sounds, a listing of favorite sounds, a listing of most recently used, accessed, or played sounds, etc.) and no particular reason is required.

Table 548 includes a row for each digital audio signal source presented. In this example, four rows 550, 552, 554, and 546 are presented but could be more or less in other scenarios. Each row corresponds to a digital audio signal and indicates a playback time length of the signal, a waveform of the signal, a filename of the signal source, and provides user interface controls (e.g., a selectable button or icon) for showing sounds in the corpus that are similar sounding to the selected digital audio signal. A row could include more or less information. For example, a row could indicate the sound content category or sound content categories of the digital audio signal and provide other user interface controls for operations such as, for example, playing the audio signal, favoriting the audio signal source, or downloading the audio signal source.

FIG. 6 is a mock-up of a graphical user interface state change in response to the end-user selecting or activating "show similar" user interface controls 558 in the graphical user interface state depicted in FIG. 5, according to some embodiments. In response to the end-user selection, a number of additional rows 658, 660, 662, 664, and 666 are displayed in table 548. The additional rows represent digital audio signal sources in the corpus containing digital audio signals that sound similar to the selected reference audio signal source represented by row 552. In this example, all of the similar audio signals including the reference audio signal sound like a strike of the middle C note on an electric piano. However, all of the audio signals do not necessarily sound identical.

To determine the most similar sounding audio signals in the corpus to the reference audio signal, sound embeddings generated for the signals by the target model for a sound content category to which the signals belong may be used. For example, an approximate nearest neighbors search algorithm or other suitable search algorithm may be used to identify a top-N (e.g., top-5) signals in the corpus that sound similar to the reference audio signal where the computed cosine distance between sound embeddings for the signals is used as the similarity/dissimilarity measure for the search algorithm. While in some embodiments the cosine distance is used as the similarity/dissimilarity measure for the search algorithm, other distance measurements are used in other embodiments. For example, the Euclidean distance or other suitable distance measure could be used.

Thus, as a result of the sound embeddings generated for digital audio signals in the corpus, the end-user is able to discover digital audio signal sources (e.g., files) containing digital audio signals that sound similar to a selected reference audio signal in the corpus without having to keyword search for the similar sounding audio signals and without having to listen to (playback) the similar sounding audio signals to decide if they sound similar.

4.2 Sound as Search Input

According to some embodiments, an end-user provides a digital audio sound recording captured using their personal computing device as input to the similar sound search instead of selecting an existing digital audio signal source in the corpus. In other words, the reference digital audio signal is one that is generated based on a microphone recording of a sound that the end-user generates or performs. The microphone may be a component of or coupled to the end-user's personal computing device. The personal computing device may be coupled to the server system by a data communications network (e.g., the Internet). The server system may implement the similar sound search and have access to a corpus of digital audio signal sources and their associated generated sound embeddings generated using techniques disclosed herein.

For example, in some embodiments of the present invention, the end-user personal computing device is a mobile phone or other portable computing device configured with a microphone. The device is configured with an application (mobile application). With the application, the end-user can select via graphical user interface controls of the application a "start recording" or similar option. Upon selecting this option, the microphone is activated and the device in cooperation with the application begins recording sound captured by the microphone as a digital audio signal. The end-user may then produce the desired sound to be captured by the microphone. For example, the end-user may sing a melody of interest, play an instrument, tap out a drum pattern of interest, or vocally beatbox a drum or rhythmic pattern of interest. Once the end-user has finished producing or performing the desired sound, the end-user may select a "stop recording" or similar option via graphical user interface controls of the application.

The application may then offer via graphical user interface controls an option for the end-user to search for sounds similar to the recorded sound. Upon selecting this option, the device in cooperation with the application may submit the recorded digital audio signal over the network to the server system. The server system may generate a sound embedding for the digital audio signal using techniques disclosed herein. For example, a magnitude spectrogram for a selected slice of the digital audio signal may be generated using techniques disclosed herein and the generated spectrogram may be input through a forward pass of an artificial neural network configured with a target model to generate a sound embedding for the recorded digital audio signal.

Once the sound embedding is generated, similar sounds in a corpus of digital audio signal sources can be identified using a search algorithm (e.g., approximate nearest neighbors search) and the top-N most similar sounding digital audio signal sources in the corpus can be returned to the end-user's device for presentation to the end-user by the mobile application. For example, table rows like rows 658, 660, 662, 664, and 666 may be presented to the end-user in a graphical user interface of the application for the most similar sounding digital audio signal sources.

In some embodiments of the present invention, a sound content category of the recorded digital audio signal is selected by the end-user (e.g., via graphical user interface controls of the application). In some embodiments of the present invention, a sound content category of the recorded digital audio signal is automatically detected by the application or the server system. The server system can select the appropriate target model to use to generate the sound embedding for the recorded digital audio signal based on the selected or detected sound content category. The server system can also select the corpus of digital audio signal sources to search for similar sounds based on the selected or detected sound content category such that all digital audio signal sources considered for the search are assigned to or belong to the selected or detected sound content category and having comparable sound embeddings generated by the same target model as the target model used to generate the sound embedding for the recorded digital audio signal.

4.3 Near-Duplicate Sound Detection

According to some embodiments of the present invention, sound embeddings generated for digital audio signals are used to detect near duplicate sounds. For example, an existing digital audio signal in a corpus (library) of digital audio signals may encompass an original work of authorship such as, for example, an original vocal sample, an original drum rhythm, or an original instrument progression (e.g., an original melodic riff). The digital audio signal may be modified slightly by another person using one or more processes such as, for example, compression, equalization, time-stretching, pitch-shifting, etc. to generate a new digital audio signal that this person adds to the corpus offering it as their own original work of authorship. The curator or operator of the corpus (e.g., a cloud-based digital music library provider) would appreciate techniques that aid in the identification of such near-duplicate digital audio signals for the purpose of preventing copyright disputes or for other purposes where identifying near-duplicate sounds is useful.

With the techniques disclosed herein for generating sound embeddings for digital audio signals, a sound embedding can be generated for a digital audio signal submitted or uploaded for addition to a corpus or library of digital audio signals. The sound embedding generated for the submitted or uploaded digital audio signal can be compared by a distance measure to sound embeddings generated for existing digital audio signals in the corpus or library. If the distance (e.g., cosine similarity, Euclidean distance, etc.) between (a) the sound embedding for the submitted or uploaded digital audio signal and (b) the sound embedding for an existing digital audio signal is below a threshold (i.e., close in distance), then the submitted or uploaded digital audio signal and the existing digital audio signal can be flagged (indicated) (e.g., in a computer database or in a computer graphical user interface) as near-duplicates of each other.

In some embodiments of the present invention, the distance threshold may vary depending on the sound content category of digital audio signals. For example, the distance threshold may vary depending on the variance of the statistical distributions of the signals in the sound content category. A small distance threshold may be used for a given sound content category when the statistical distribution's variance in the given sound content category is small and a larger distance threshold may be used when the degree of statistical variance is larger. For example, signals in a drum one-shot category can have relatively small variance, since the statistical distributions of the signals in the category may have a lot in common (e.g., position of the onset, homogeneous duration and decay pattern, less variety of timbre, etc.). As a result, the sound embeddings generated for signals in a drum one-shot category may on average have smaller distances between them then, for example, the sound embeddings generated for signals in an instrument one-shot category or other category having greater variance in the statistical distributions of the signals in the category. As a consequence, for near-duplicate detection, smaller distance thresholds may be used for smaller variance categories in order to increase the accuracy of near-duplicate detection (e.g., reduce false positives). Larger distance thresholds may also be used for larger variance categories in order to increase the accuracy of near-duplicate detection (e.g., reduce false negatives).

5.0 Implementation Mechanisms—Hardware Overview

Referring now to FIG. 7, it is a block diagram that illustrates an example computing device 700 with which some embodiments of the present invention may be implemented.

Computing device 700 and its components, including their connections, relationships, and functions, are provided as an example only, and not meant to limit implementations of the present invention. Other computing devices suitable for implementing some embodiments of the present invention may have different components, including components with different connections, relationships, and functions.

Computing device 700 includes a bus 702 or other communication mechanism for addressing main memory 706 and for transferring data between and among the various components of device 700.

Computing device 700 also includes one or more hardware processors 704 coupled with bus 702 for processing information. A hardware processor 704 may be a general-purpose microprocessor such as a central processing unit (CPU), a system on a chip (SoC), a graphics processing unit (GPU), or other type of microprocessor.

Main memory 706, such as a random-access memory (RAM) or other dynamic storage device, is coupled to bus 702 for storing information and software instructions to be executed by processor(s) 704. Main memory 706 also may be used for storing temporary variables or other intermediate information during execution of software instructions to be executed by processor(s) 704.

Software instructions, when stored in storage media accessible to processor(s) 704, render computing device 700 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 700 includes read only memory (ROM) 708 or other static storage device coupled to bus 702 for storing static information and software instructions for processor(s) 704.

One or more mass storage devices 710 are coupled to bus 702 for persistently storing information and software instructions on fixed or removable media, such as magnetic, optical, solid-state, magnetic-optical, flash memory, or any other available mass storage technology. The mass storage may be shared on a network, or it may be dedicated mass storage.

Typically, at least one of the mass storage devices 710 (e.g., the main solid state drive or hard disk for the device) stores a body of program and data for directing operation of the computing device, including an operating system, user application programs, driver and other support files, as well as other data files of all sorts.

Computing device 700 may be coupled via bus 702 to display 712, such as a liquid crystal display (LCD) or other electronic visual display, for displaying information to a computer user. In some configurations, a touch sensitive surface incorporating touch detection technology (e.g., resistive, capacitive, etc.) may be integrated with display 712 to form a touch sensitive display for communicating touch gesture (e.g., finger or stylus) input to processor(s) 704.

An input device 714, including alphanumeric and other keys, may be coupled to bus 702 for communicating information and command selections to processor 704. In addition to or instead of alphanumeric and other keys, input device 714 may include one or more physical buttons or switches such as, for example, a power (on/off) button, a "home" button, volume control buttons, or the like.

Another type of user input device may be a cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

While in some configurations, such as the configuration depicted in FIG. 7, one or more of display 712, input device 714, and cursor control 716 are external components (e.g., peripheral devices) of computing device 700, some or all of display 712, input device 714, and cursor control 716 are integrated as part of the form factor of computing device 700 in other configurations.

Functions of the disclosed systems, methods, and modules may be performed by computing device 700 in response to processor(s) 704 executing one or more programs of software instructions contained in main memory 706. Such software instructions may be read into main memory 706 from another storage medium, such as storage device(s) 710. Execution of the software instructions contained in main memory 706 cause processor(s) 704 to perform the functions of some embodiments of the present invention.

While functions and operations of some embodiments of the present invention may be implemented entirely with software instructions, hard-wired or programmable circuitry of computing device 700 (e.g., an ASIC, a FPGA, or the like) may be used in some embodiments of the present invention in place of or in combination with software instructions to perform the functions, according to the requirements of the particular implementation at hand.

The term "storage media" as used herein refers to any non-transitory media that store data or software instructions that cause a computing device to operate in a specific fashion. Such storage media may comprise non-volatile media or volatile media. Non-volatile media includes, for example, non-volatile random-access memory (NVRAM), flash memory, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infrared data communications.

Various forms of media may be involved in carrying one or more sequences of one or more software instructions to processor(s) 704 for execution. For example, the software instructions may initially be carried on a magnetic disk or solid-state drive of a remote computer.

The remote computer can load the software instructions into its dynamic memory and send the software instructions over a telephone line using a modem. A modem local to computing device 700 can receive the data on the telephone line and use an infrared transmitter to convert the data to an infrared signal. An infrared detector can receive the data carried in the infrared signal and appropriate circuitry can place the data on bus 702. Bus 702 carries the data to main memory 706, from which processor(s) 704 retrieves and executes the software instructions. The software instructions received by main memory 706 may optionally be stored on storage device(s) 710 either before or after execution by processor(s) 704.

Computing device 700 may also include one or more communication interface(s) 718 coupled to bus 702. A communication interface 718 provides a two-way data communication coupling to a wired or wireless network link 720 that is connected to a local network 722 (e.g., Ethernet network, Wireless Local Area Network, cellular phone network, Bluetooth wireless network, or the like). Communication interface 718 sends and receives electrical, electromagnetic, or optical signals that carry digital data streams representing various types of information. For example, communication interface 718 may be a wired network interface card, a wireless network interface card with an integrated radio antenna, or a modem (e.g., ISDN, DSL, or cable modem).

Network link(s) 720 typically provide(s) data communication through one or more networks to other data devices. For example, a network link 720 may provide a connection through a local network 722 to a host computer 724 or to data equipment operated by an Internet Service Provider (ISP) 726. ISP 726 in turn provides data communication services through the worldwide packet data communication network now commonly referred to as the "Internet" 728. Local network(s) 722 and Internet 728 use electrical, electromagnetic or optical signals that carry digital data streams. The signals through the various networks and the signals on network link(s) 720 and through communication interface(s) 718, which carry the digital data to and from computing device 700, are example forms of transmission media.

Computing device 700 can send messages and receive data, including program code, through the network(s), network link(s) 720 and communication interface(s) 718. In the Internet example, a server 730 might transmit a requested code for an application program through Internet 728, ISP 726, local network(s) 722 and communication interface(s) 718. The received code may be executed by processor 704 as it is received, and/or stored in storage device 710, or other non-volatile storage for later execution.

The received code may be executed by processor 704 as it is received, and/or stored in storage device 710, or other non-volatile storage for later execution.

6.0 Implementation Mechanisms—Software Overview

Figure 8:
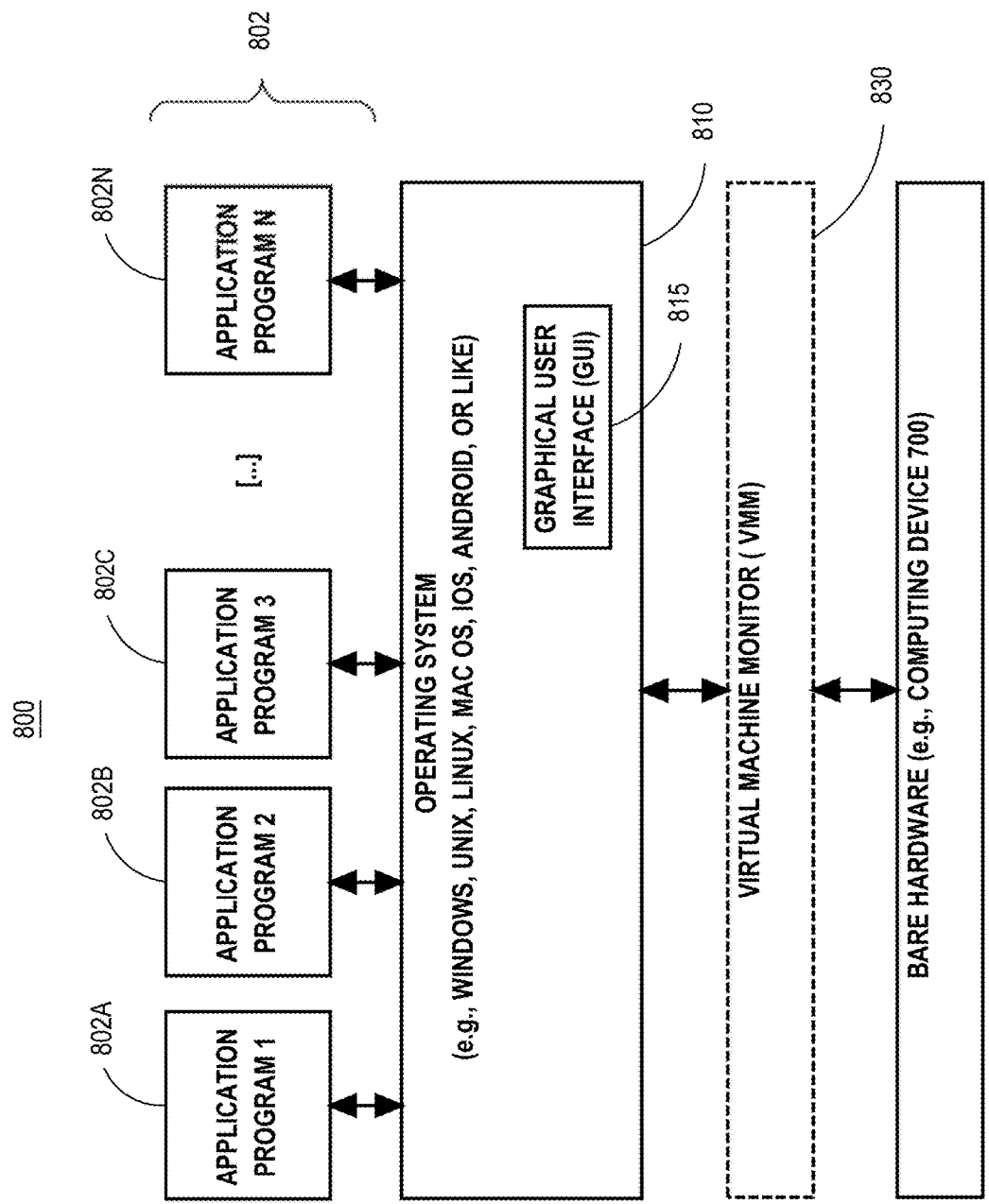
FIG. 8 is a schematic diagram of an example software system for controlling the operation of the example computing device of FIG. 7.

FIG. 8 is a block diagram of an example software system 800 that may be employed for controlling the operation of example computing device 800. Software system 800 and its components, including their connections, relationships, and functions, is meant to be exemplary only, and not meant to limit implementations of the present invention. Other software systems suitable for implementing some embodiments of the present invention may have different components, including components with different connections, relationships, and functions.

Software system 800 is provided for directing the operation of computing device 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on device 800 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of device 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the device 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of device 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide paravirtualization to a guest operating system in some instances.

The above-described basic computer hardware and software is presented for the purpose of illustrating the basic underlying computer components that may be employed for implementing some embodiments of the present invention. The present invention, however, is not necessarily limited to any particular computing environment or computing device configuration. Instead, some embodiments of the present invention may be implemented in any type of system architecture or processing environment that one skilled in the art, in light of this disclosure, would understand as capable of supporting the features and functions presented herein.

7.0 Other Aspects of the Disclosure

Unless the context clearly indicates otherwise, the term "or" is used in the foregoing specification and in the appended claims in its inclusive sense (and not in its exclusive sense) so that when used, for example, to connect a list of elements, the term "or" means one, some, or all of the elements in the list.

Unless the context clearly indicates otherwise, the terms "comprising," "including," "having," "based on," "encompassing," and the like, are used in the foregoing specification and in the appended claims in an open-ended fashion, and do not exclude additional elements, features, acts, or operations.

Unless the context clearly indicates otherwise, conjunctive language such as the phrase "at least one of X, Y and Z," is to be understood to convey that an item, term, etc. may be either X, Y or Z, or a combination thereof. Thus, such conjunctive language is not intended to imply that certain embodiments require at least one of X, at least one of Y and at least one of Z to each be present.

Unless the context clearly indicates otherwise, as used in the foregoing detailed description and in the appended claims, the singular forms "a," "an," and "the" are intended to include the plural forms as well.

Unless the context clearly indicates otherwise, in the foregoing detailed description and in the appended claims, although the terms first, second, etc. are, in some instances, used herein to describe various elements, these elements should not be limited by these terms. These terms are only used to distinguish one element from another. For example, a first computing device could be termed a second computing device, and, similarly, a second computing device could be termed a first computing device. The first computing device and the second computing device are both computing devices, but they are not the same computing device.

In the foregoing specification, some embodiments of the present invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A method comprising:
reading a particular digital audio signal source of a set of digital audio signal sources associated with a particular sound content category;
generating a time-frequency representation based on the particular digital audio signal;
learning, using an artificial neural network, a set of numerical codes providing a latent-space representation of the time-frequency representation, wherein the set of numerical codes has a dimensionality that is less than a dimensionality of the time-frequency representation;
repeating the reading, generating, and learning for each of a plurality of other digital audio signal sources of the set of digital audio signal sources in the particular sound content category to train the artificial neural network;
obtaining a set of learned model parameters from the trained artificial neural network;
storing the set of learned model parameters for the particular sound content category in computer storage media;

generating a first time-frequency representation based on
a first digital audio signal associated with the particular
sound content category;
using the set of learned model parameters to compute a
first set of numerical codes providing a latent-space
representation of the first time-frequency representation;
generating a second time-frequency representation based
on a second digital audio signal associated with the
particular sound content category;
using the set of learned model parameters to compute a
second set of numerical codes providing a latent-space
representation of the second time-frequency representation; and
computing a distance between the first set of numerical
codes and the second set of numerical codes.

2. The method of claim 1, further comprising:
based on the distance, causing an indication to be presented in a computer graphical user interface that the first digital audio signal and the second digital audio signal encompass similar sounds.

3. The method of claim 1, further comprising:
receiving the first digital audio signal over a data communications network from a computing device; and
wherein the first digital audio signal is captured by the computing device using a microphone of, or operatively coupled to, the computing device that records a human-audible performance.

4. The method of claim 1, further comprising:
comparing the distance to a distance threshold; and
based on the distance being below the distance threshold, causing an indication to be presented in a computer graphical user interface that the first digital audio signal and the second digital audio signal encompass near-duplicate sounds.

5. The method of claim 4, further comprising:
selecting the distance threshold based on the particular sound content category.

6. The method of claim 4, further comprising:
computing the distance between the first set of numerical codes and the second set of numerical codes based on a cosine similarity between the first set of numerical codes and the second set of numerical codes.

7. The method of claim 1, wherein the particular sound content category is selected from the group consisting of loops and one-shots.

8. The method of claim 1, wherein the particular sound content category is selected from the group consisting of drum loops, drum one-shots, instrument loops, and instrument one-shots.

9. The method of claim 1, wherein the artificial neural network comprises an input layer, one or more encoder intermediate layers, a bottleneck layer, one or more decoder intermediate layers, and an output layer; and wherein the method further comprises obtaining the set of numerical codes providing the latent-space representation of the time-frequency representation from the bottleneck layer.

10. The method of claim 9, wherein the one or more encoder intermediate layers comprise one or more convolutional layers; and wherein the one or more decoder intermediate layers comprise one or more convolutional layers.

11. The method of claim 1, wherein generating the time-frequency representation based on the particular digital audio signal is based on:
obtaining a pre-processed signal based on the particular digital audio signal;
generating a duration normalized signal based on the pre-processed signal;
selecting a time-shifted slice signal of the duration normalized signal, the time-shifted slice signal having a particular duration; and
generating the time-frequency representation based on the time-shifted slice signal.

12. The method of claim 11, further comprising:
selecting the particular duration based on the particular sound content category.

13. The method of claim 1, wherein generating the time-frequency representation based on the particular digital audio signal is based on:
generated a duration normalized signal based on the particular digital audio signal;
generating a pre-processed signal based on the duration normalized signal;
selecting a time-shifted slice signal of the pre-processed signal, the time-shifted slice signal having a particular duration; and
generating the time-frequency representation based on the time-shifted slice signal.

14. The method of claim 13, further comprising:
selecting the particular duration based on the particular sound content category.

15. The method of claim 1, further comprising:
generating a plurality of time-frequency representations based on the particular digital audio signal; and
learning, using the artificial neural network, a plurality of sets of numerical codes providing latent-space representations of the plurality of time-frequency representations.

16. The method of claim 15, wherein the particular sound content category is a loop-type sound content category.

17. A computing system comprising:
one or more processors;
storage media; and
instructions stored in the storage media which, when executed by the computing system, cause the computing system to perform:
generating a plurality of time-frequency representations based on a plurality of digital audio signals associated with a particular sound content category;
training an artificial neural network to learn a plurality of sets of numerical codes providing a plurality of latent-space representations of the plurality of time-frequency representations;
obtaining a set of learned model parameters from the trained artificial neural network;
storing the set of learned model parameters for the particular sound content category in computer storage media;
generating a first time-frequency representation based on a first digital audio signal associated with the particular sound content category;
using the set of learned model parameters to compute a first set of numerical codes providing a latent-space representation of the first time-frequency representation;
generating a second time-frequency representation based on a second digital audio signal associated with the particular sound content category;
using the set of learned model parameters to compute a second set of numerical codes providing a latent-space representation of the second time-frequency representation; and computing a distance between the first set of numerical codes and the second set of numerical codes.

18. The computing system of claim 17, further comprising instructions which, when executed by the computing system, cause the computing system to perform:

based on the distance, causing an indication to be presented in a computer graphical user interface that the first digital audio signal and the second digital audio signal encompass similar sounds.

19. The computing system of claim 17, further comprising instructions which, when executed by the computing system, cause the computing system to perform:

receiving the first digital audio signal over a data communications network from a computing device; and wherein the first digital audio signal is captured by the computing device using a microphone of, or operatively coupled to, the computing device that records a human-audible performance.

20. The computing system of claim 17, further comprising instructions which, when executed by the computing system, cause the computing system to perform:

comparing the distance to a distance threshold; and based on the distance being below the distance threshold, causing an indication to be presented in a computer graphical user interface that the first digital audio signal and the second digital audio signal encompass near-duplicate sounds.

\* \* \* \* \*